(12) United States Patent
Ramabadran et al.

(10) Patent No.: US 6,961,696 B2
(45) Date of Patent: Nov. 1, 2005

(54) CLASS QUANTIZATION FOR DISTRIBUTED SPEECH RECOGNITION

(75) Inventors: Tenkasi V. Ramabadran, Naperville, IL (US); Alexander Sorin, Haifa (IL)

(73) Assignees: Motorola, Inc., Schaumburg, IL (US); International Business Machines Corporation, Armonk, NY (US)

(*) Notice: Subject to any disclaimer, the term of this patent is extended or adjusted under 35 U.S.C. 154(b) by 211 days.

(21) Appl. No.: 10/360,582

(22) Filed: Feb. 7, 2003

(65) Prior Publication Data

US 2004/0158461 A1 Aug. 12, 2004

(51) Int. Cl.[7] ............................................. G10L 11/04
(52) U.S. Cl. ...................... 704/207; 704/231; 704/229; 704/232; 704/221
(58) Field of Search ............................... 704/232, 230, 704/231, 229, 207, 221, 270, 275; 379/88.02, 230; 455/557, 566

(56) References Cited

U.S. PATENT DOCUMENTS

| | | | | |
|---|---|---|---|---|
| 5,699,485 A | * | 12/1997 | Shoham | 704/223 |
| 5,732,389 A | * | 3/1998 | Kroon et al. | 704/223 |
| 5,924,066 A | * | 7/1999 | Kundu | 704/232 |
| 6,038,535 A | * | 3/2000 | Campbell | 704/275 |
| 6,058,205 A | * | 5/2000 | Bahl et al. | 382/159 |
| 6,125,284 A | * | 9/2000 | Moore et al. | 455/557 |
| 6,377,915 B1 | * | 4/2002 | Sasaki | 704/206 |
| RE38,269 E | * | 10/2003 | Liu | 704/227 |
| 2002/0016161 A1 | * | 2/2002 | Dellien et al. | 455/403 |

* cited by examiner

Primary Examiner—Vijay B. Chawan
(74) Attorney, Agent, or Firm—Fleit, Kain, Gibbons, Gutman, Bongini & Bianco P.L.

(57) ABSTRACT

A system, method and computer readable medium for quantizing class information and pitch information of audio is disclosed. The method on an information processing system includes receiving audio and capturing a frame of the audio. The method further includes determining a pitch of the frame and calculating a codeword representing the pitch of the frame, wherein a first codeword value indicates an indefinite pitch. The method further includes determining a class of the frame, wherein the class is any one of at least two classes indicating an indefinite pitch and at least one class indicating a definite pitch. The method further includes calculating a codeword representing the class of the frame, wherein the codeword length is the maximum of the minimum number of bits required to represent the at least two classes and the minimum number of bits required to represent the at least one class.

19 Claims, 8 Drawing Sheets

CLASS QUANTIZATION FOR DISTRIBUTED SPEECH RECOGNITION

CROSS-REFERENCE TO RELATED APPLICATION

The present patent application is related to co-pending and commonly owned

The present patent application is related to co-pending and commonly owned U.S. patent application Ser. No. 10/380,581, entitled "Pitch Quantization For Distributed Speech Recognition", filed on even date with the present patent application, the entire teachings of which being hereby incorporated by reference.

FIELD OF THE INVENTION

The present invention generally relates to the field of distributed speech recognition systems, and more particularly relates to distributed speech recognition for narrow bandwidth communications and wireless communications.

BACKGROUND OF THE INVENTION

With the advent of pagers and mobile phones the wireless service industry has grown into a multi-billion dollar industry. The bulk of the revenues for Wireless Service Providers (WSPs) originate from subscriptions. As such, a WSP's ability to run a successful network is dependent on the quality of service provided to subscribers over a network having a limited bandwidth. To this end, WSPs are constantly looking for ways to mitigate the amount of information that is transmitted over the network while maintaining a high quality of service to subscribers.

Recently, speech recognition has enjoyed success in the wireless service industry. Speech recognition is used for a variety of applications and services. For example, a wireless service subscriber can be provided with a speed-dial feature whereby the subscriber speaks the name of a recipient of a call into the wireless device. The recipient's name is recognized using speech recognition and a call is initiated between the subscriber and the recipient. In another example, caller information (411) can utilize speech recognition to recognize the name of a recipient to whom a subscriber is attempting to place a call.

As speech recognition gains acceptance in the wireless community, Distributed Speech Recognition (DSR) has arisen as an emerging technology. DSR refers to a framework in which the feature extraction and the pattern recognition portions of a speech recognition system are distributed. That is, the feature extraction and the pattern recognition portions of the speech recognition system are performed by two different processing units at two different locations. Specifically, the feature extraction process is performed on the front-end, i.e., the wireless device, and the pattern recognition process is performed on the back-end, i.e., by the wireless service provider. DSR enhances speech recognition for more complicated tasks such as automated airline booking with spoken flight information or brokerage transactions with similar features.

The European Telecommunications Standards Institute (ETSI) promulgates a set of standards for DSR. The ETSI DSR standards ES 201 108 (April 2000) and ES 202 050 (July 2002) define the feature extraction and compression algorithms at the front-end. These standards, however, do not incorporate speech reconstruction at the back-end, which may be important in some applications. As a result, new Work Items WI-030 and WI-034 have been released by ETSI to extend the above standards (ES 201 108 and ES 202 050, respectively) to include speech reconstruction at the back-end as well as tonal language recognition.

In the current DSR standards, the features that are extracted, compressed, and transmitted to the back-end are 13 Mel Frequency Cepstral Coefficients (MFCC), C0–C12, and the logarithm of the frame-energy, log-E. These features are updated every 10 ms or 100 times per second. In the proposals for the extended standards (i.e., in response to the Work Items described above), pitch and class (or voicing) information are also derived for each frame and transmitted in addition to the MFCC's and log-E. This increases the amount of information that is transmitted by the wireless device over the network and consumes additional bandwidth. Thus, it is desirable that the representation of class and pitch information be as compact as possible in order to keep the bit rate low.

In speech coders, the normal practice has been to quantize the pitch information and the class information separately. In some coders, "unvoiced" class is represented by a "zero pitch value", e.g., the Mixed Excitation Linear Predictive (MELP) coder, which is the U.S. Federal Standard at 2400 bps. Unfortunately, the multiple types of classes proposed for the extended standards require increased amount of information to represent, and increased bandwidth to transmit, the class information.

Therefore a need exists to overcome the problems with the prior art as discussed above.

SUMMARY OF THE INVENTION

Briefly, in accordance with the present invention, disclosed is a system, method and computer readable medium for quantizing class information and pitch information of audio. In an embodiment of the present invention, the method on an information processing system includes receiving audio and capturing a frame of the audio. The method further includes determining a pitch of the frame and calculating a codeword representing the pitch of the frame, wherein a first codeword value indicates an indefinite pitch. The method further includes determining a class of the frame, wherein the class is any one of at least two classes indicating an indefinite pitch and at least one class indicating a definite pitch. The method further includes calculating a codeword representing the class of the frame, wherein the codeword length is the maximum of the minimum number of bits required to represent the at least two classes indicating an indefinite pitch and the minimum number of bits required to represent the at least one class indicating a definite pitch. The pitch and the class of the frame are represented by the two codewords.

In another embodiment of the present invention, an information processing system for quantizing class information and pitch information of audio, includes a microphone for receiving audio and capturing a frame of the audio. The information processing system further includes a digital signal processor for determining a pitch of the frame and calculating a codeword representing the pitch of the frame, wherein a first codeword value indicates an indefinite pitch. The digital signal processor further determines a class of the frame, wherein the class is any one of at least two classes indicating an indefinite pitch and at least one class indicating a definite pitch. The digital signal processor further calculates a codeword representing the class of the frame, wherein the codeword length is the maximum of the minimum number of bits required to represent the at least two classes indicating an indefinite pitch and the minimum number of bits required to represent the at least one class indicating a definite pitch. The pitch and the class of the frame are represented by the two codewords.

The preferred embodiments of the present invention are advantageous because they serve to decrease the amount of bits used to transmit audio information over a communications network. This is beneficial because communications networks possess limited bandwidth. The bit savings are translated into making more bandwidth available for current or additional subscribers. Thus, the present invention provides both an improvement in network performance and an increase in communications quality.

DETAILED DESCRIPTION

The present invention, according to a preferred embodiment, advantageously overcomes problems with the prior art by effectively reducing the number of bits used in class quantization, as will be discussed in detail below.

I. Overview

Figure 1:
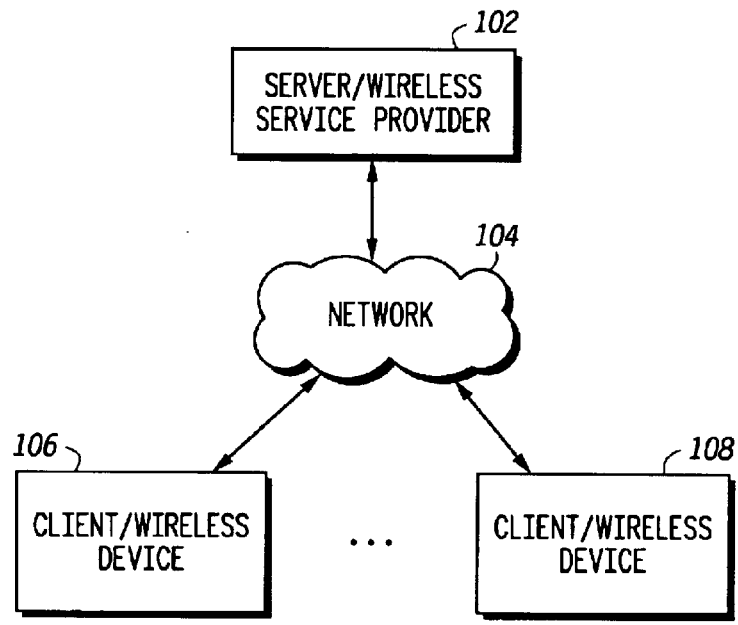
FIG. 1 is a block diagram illustrating a network for distributed speech recognition according to a preferred embodiment of the present invention.

FIG. 1 is a block diagram illustrating a network for Distributed Speech Recognition (DSR) according to a preferred embodiment of the present invention. FIG. 1 shows a network server or wireless service provider 102 operating on a network 104, which connects the server/wireless service provider 102 with clients 106 and 108. In one embodiment of the present invention, FIG. 1 represents a network computer system, which includes a server 102, a network 104 and client computers 106 through 108. In a first embodiment, the network 104 is a circuit switched network, such as the Public Service Telephone Network (PSTN). Alternatively, the network 104 is a packet switched network. The packet switched network is a wide area network (WAN), such as the global Internet, a private WAN, a local area network (LAN), a telecommunications network or any combination of the above-mentioned networks. In another alternative, the network 104 is a wired network, a wireless network, a broadcast network or a point-to-point network.

In the first embodiment, the server 102 and the computer clients 106 and 108 comprise one or more Personal Computers (PCs) (e.g., IBM or compatible PC workstations running the Microsoft Windows 95/98/2000/ME/CE/NT/XP operating system, Macintosh computers running the Mac OS operating system, PCs running the LINUX operating system or equivalent), or any other computer processing devices. Alternatively, the server 102 and the computer clients 106 and 108 include one or more server systems (e.g., SUN Ultra workstations running the SunOS or AIX operating system, IBM RS/6000 workstations and servers running the AIX operating system or servers running the LINUX operating system).

In another embodiment of the present invention, FIG. 1 represents a wireless communication system, which includes a wireless service provider 102, a wireless network 104 and wireless devices 106 through 108. The wireless service provider 102 is a first-generation analog mobile phone service, a second-generation digital mobile phone service or a third-generation Internet-capable mobile phone service.

In this embodiment, the wireless network 104 is a mobile phone network, a mobile text messaging device network, a pager network, or the like. Further, the communications standard of the wireless network 104 of FIG. 1 is Code Division Multiple Access (CDMA), Time Division Multiple Access (TDMA), Global System for Mobile Communications (GSM), General Packet Radio Service (GPRS), Frequency Division Multiple Access (FDMA) or the like. The wireless network 104 supports any number of wireless devices 106 through 108, which are mobile phones, text messaging devices, handheld computers, pagers, beepers, or the like.

In this embodiment, the wireless service provider 102 includes a server, which comprises one or more Personal Computers (PCs) (e.g., IBM or compatible PC workstations running the Microsoft Windows 95/98/2000/ME/CE/NT/XP operating system, Macintosh computers running the Mac OS operating system, PCs running the LINUX operating system or equivalent), or any other computer processing devices. In another embodiment of the present invention, the server of wireless service provider 102 is one or more server systems (e.g., SUN Ultra workstations running the SunOS or AIX operating system, IBM RS/6000 workstations and servers running the AIX operating system or servers running the LINUX operating system).

As explained above, DSR refers to a framework in which the feature extraction and the pattern recognition portions of a speech recognition system are distributed. That is, the feature extraction and the pattern recognition portions of the speech recognition system are performed by two different processing units at two different locations. Specifically, the feature extraction process is performed by the front-end, e.g., the wireless devices 106 and 108, and the pattern recognition process is performed by the back-end, e.g., by a server of the wireless service provider 102. The feature extraction process, as performed on the front-end by the wireless devices 106 and 108, is described in greater detail below.

Figure 2:
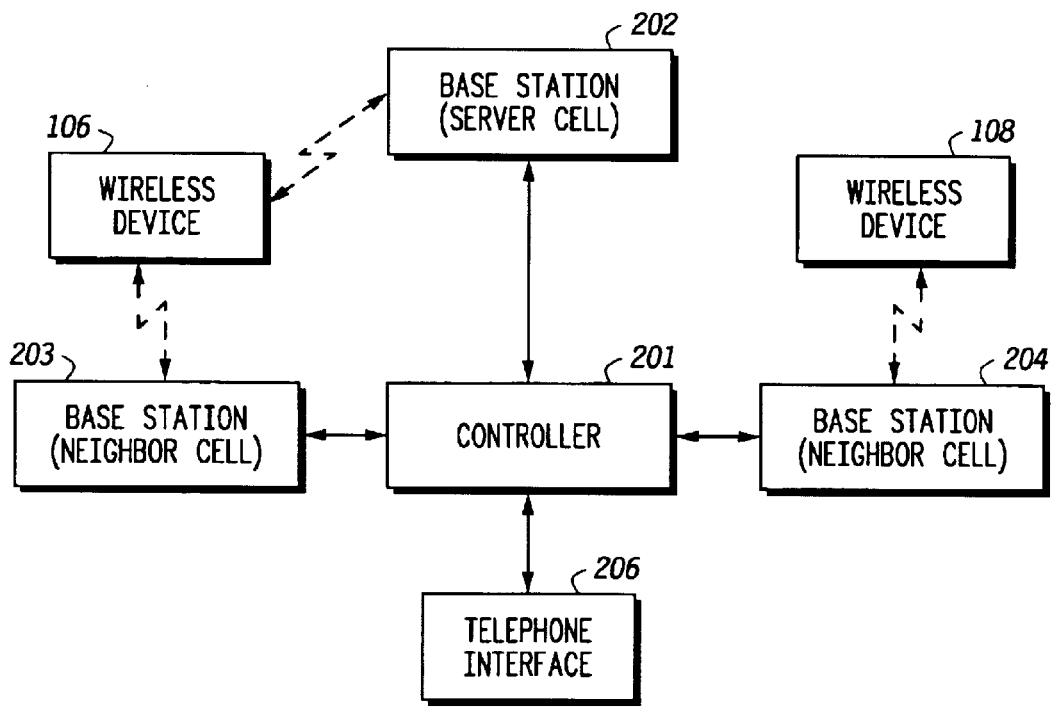
FIG. 2 is a detailed block diagram of a wireless communication system for distributed speech recognition according to a preferred embodiment of the present invention.

FIG. 2 is a detailed block diagram of a wireless communication system for DSR according to a preferred embodiment of the present invention. FIG. 2 is a more detailed block diagram of the wireless communication system described with reference to FIG. 1 above. The wireless communication system of FIG. 2 includes a controller 201 coupled to base stations 202, 203, and 204. In addition, the wireless communication system of FIG. 2 is interfaced to an external network through a telephone interface 206. The base stations 202, 203, and 204 individually support portions of a geographic coverage area containing subscriber units or transceivers (i.e., wireless devices) 106 and 108 (see FIG. 1). The wireless devices 106 and 108 interface with the base stations 202, 203, and 204 using a communication protocol, such as CDMA, FDMA, CDMA, GPRS and GSM.

The geographic coverage area of the wireless communication system of FIG. 2 is divided into regions or cells, which are individually serviced by the base stations 202, 203, and 204 (also referred to herein as cell servers). A wireless device operating within the wireless communication system selects a particular cell server as its primary interface for receive and transmit operations within the system. For example, wireless device 106 has cell server 202 as its primary cell server, and wireless device 108 has cell server 204 as its primary cell server. Preferably, a wireless device selects a cell server that provides the best communication interface into the wireless communication system. Ordinarily, this will depend on the signal quality of communication signals between a wireless device and a particular cell server.

As a wireless device moves between various geographic locations in the coverage area, a hand-off or hand-over may be necessary to another cell server, which will then function as the primary cell server. A wireless device monitors communication signals from base stations servicing neighboring cells to determine the most appropriate new server for hand-off purposes. Besides monitoring the quality of a transmitted signal from a neighboring cell server, the wireless device also monitors the transmitted color code information associated with the transmitted signal to quickly identify which neighbor cell server is the source of the transmitted signal.

Figure 3:
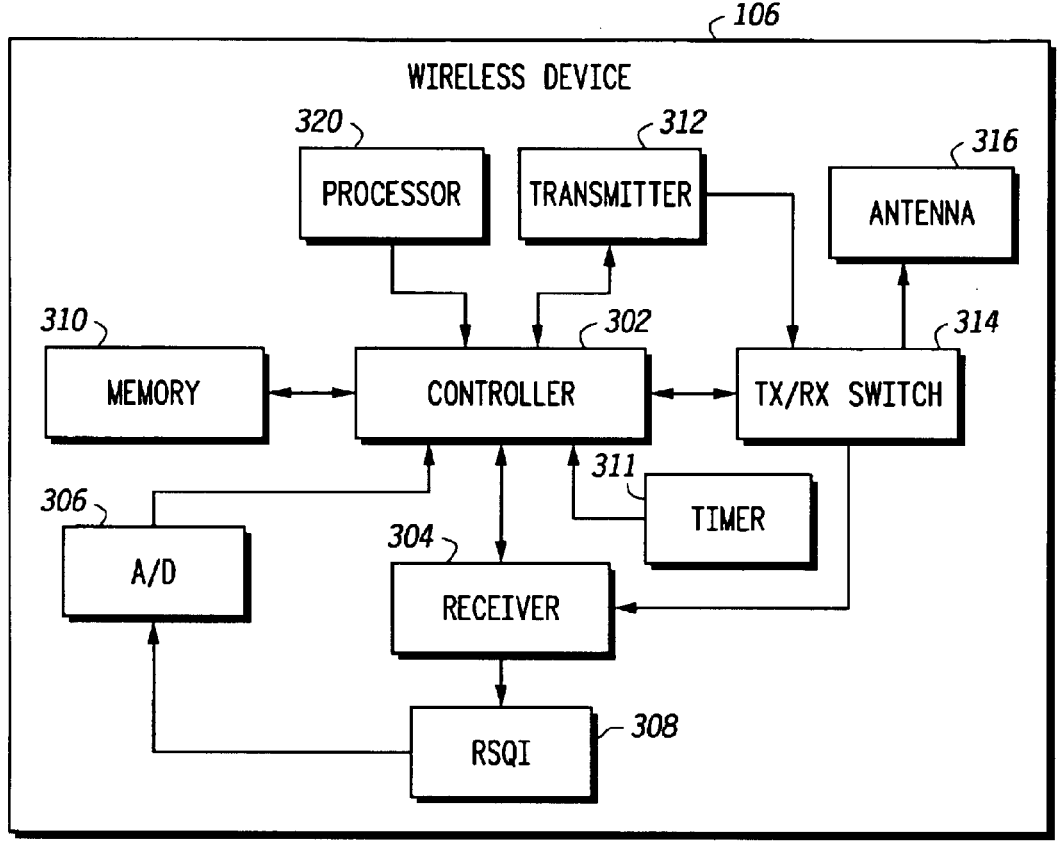
FIG. 3 is a block diagram illustrating a wireless device for a wireless communication system according to a preferred embodiment of the present invention.

FIG. 3 is a block diagram illustrating a wireless device for a wireless communication system according to a preferred embodiment of the present invention. FIG. 3 is a more detailed block diagram of a wireless device described with reference to FIGS. 1 and 2 above. FIG. 3 shows a wireless device 106, such as shown in FIG. 1. In one embodiment of the present invention, the wireless device 106 is a two-way radio capable of receiving and transmitting radio frequency signals over a communication channel under a communications protocol such as CDMA, FDMA, CDMA, GPRS or GSM. The wireless device 106 operates under the control of a controller 302 which switches the wireless device 106 between receive and transmit modes. In receive mode, the controller 302 couples an antenna 316 through a transmit/receive switch 314 to a receiver 304. The receiver 304 decodes the received signals and provides those decoded signals to the controller 302. In transmit mode, the controller 302 couples the antenna 316, through the switch 314, to a transmitter 312.

The controller 302 operates the transmitter and receiver according to instructions stored in memory 310. The stored instructions include a neighbor cell measurement scheduling algorithm. Memory 310 is Flash memory, other non-volatile memory, random access memory (RAM), dynamic random access memory (DRAM) or the like. A timer module 311 provides timing information to the controller 302 to keep track of timed events. Further, the controller 302 can utilize the time information from the timer module 311 to keep track of scheduling for neighbor cell server transmissions and transmitted color code information.

When a neighbor cell measurement is scheduled, the receiver 304, under the control of the controller 302, monitors neighbor cell servers and receives a "received signal quality indicator" (RSQI). RSQI circuit 308 generates RSQI signals representing the signal quality of the signals transmitted by each monitored cell server. Each RSQI signal is converted to digital information by an analog-to-digital converter 306 and provided as input to the controller 302. Using the color code information and the associated received signal quality indicator, the wireless device 106 determines the most appropriate neighbor cell server to use as a primary cell server when hand-off is necessary.

Processor 320 in FIG. 3 performs various functions such as the functions attributed to distributed speech recognition, described in greater detail below. In various embodiments of the present invention, the processor 320 in FIG. 3 is a single processor or more than one processor for performing the tasks described above.

II. Distributed Speech Recognition

Figure 4:
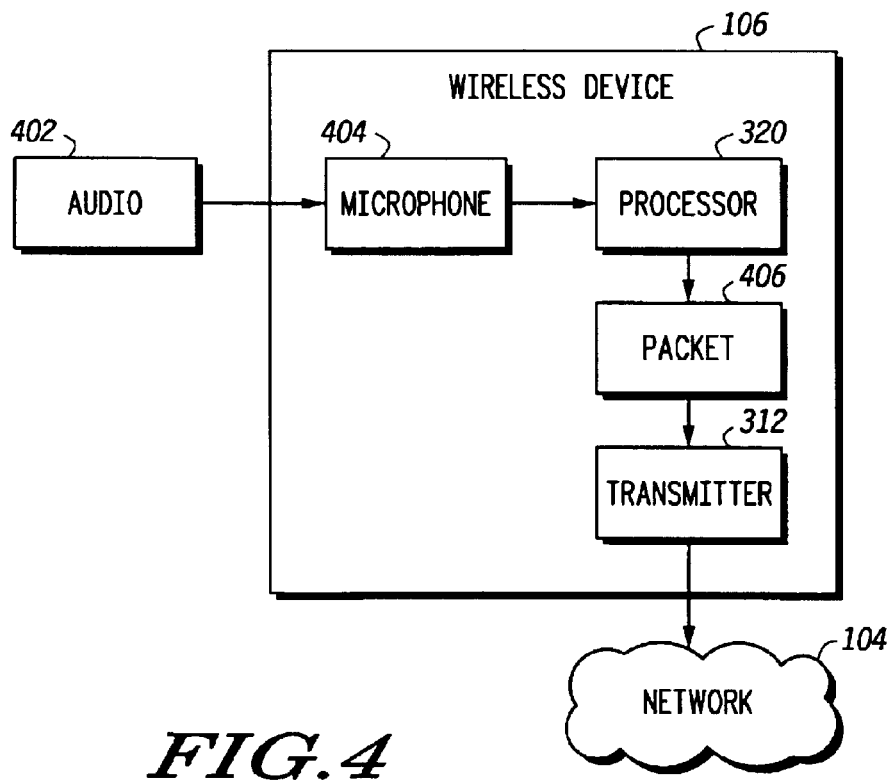
FIG. 4 is a block diagram illustrating data exchange of a wireless device with the wireless service provider.

FIG. 4 is a block diagram illustrating data exchange of a wireless device 106 with the wireless service provider 102. FIG. 4 is a more detailed block diagram of a wireless device 106 described with reference to FIGS. 1 and 2 above. Some of the functions that are performed at the wireless device 106 are also shown. FIG. 4 shows a wireless device 106 and the wireless network 104, such as shown in FIG. 1. Also shown are the processor 320 and the transmitter 312 of the wireless device 106, as shown in FIG. 3.

In one embodiment of the present invention, the wireless device 106 also includes a microphone 404 for receiving audio 402. The received audio 402 is then processed by the processor 320. Among the processes performed by processor 320, the class and pitch of a frame of audio 402 are quantized by the processor 320. The class and pitch of a frame of audio 402 is embodied in at least one codeword that is included in a packet 406. The packet 406 is then transmitted by the transmitter 312 via the network 104 to a server or wireless service provider 102. The processes of quantizing the class and pitch of a frame of audio 402 and generating at least one codeword are described in greater detail below.

Figure 5:
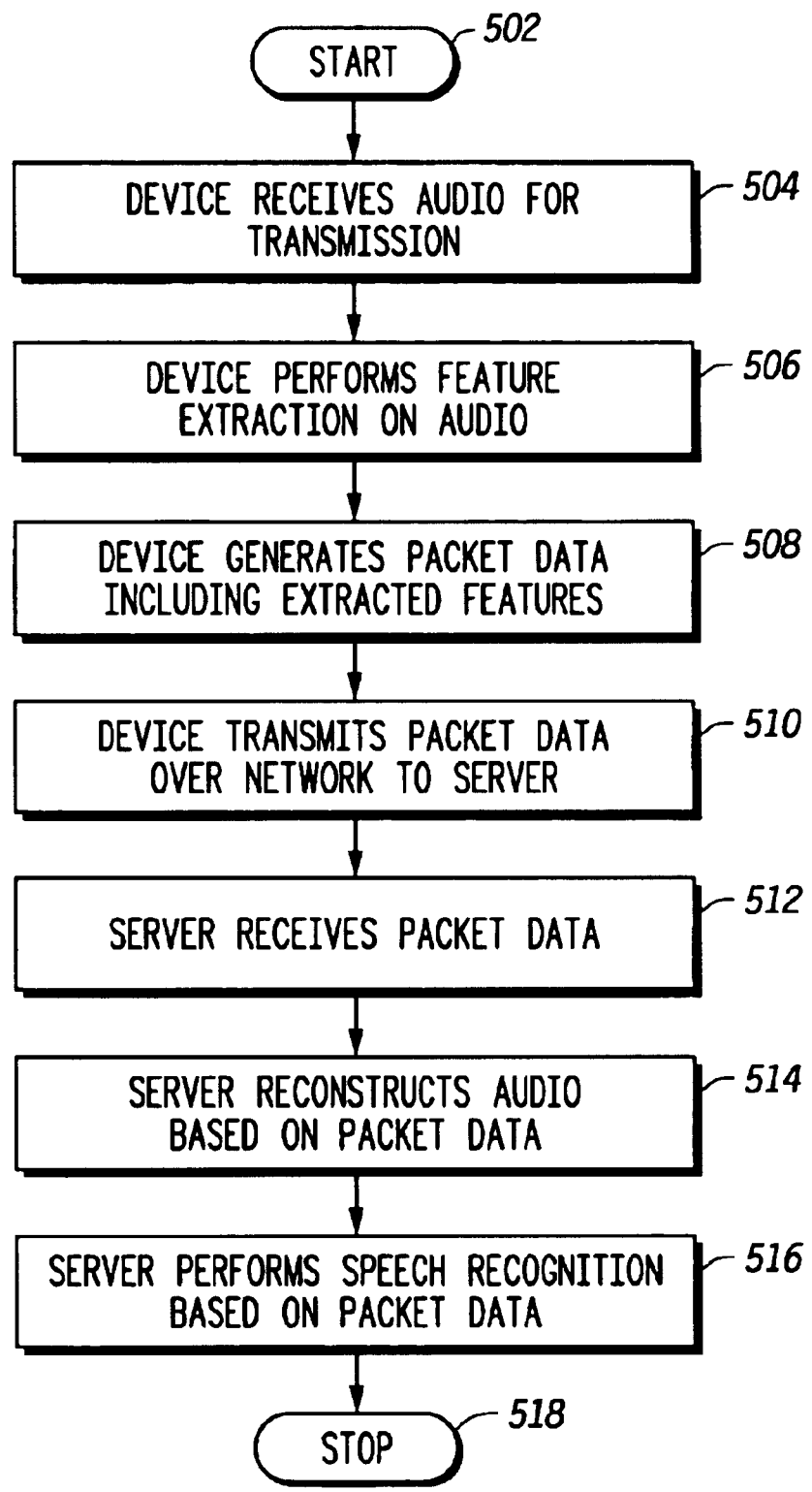
FIG. 5 is an operational flow diagram showing the overall distributed speech recognition process according to a preferred embodiment of the present invention.

FIG. 5 is an operational flow diagram showing the overall distributed speech recognition process according to a preferred embodiment of the present invention. The operational flow diagram of FIG. 5 depicts the process, on a client 106, of performing feature extraction of incoming audio and the process, at the server or wireless service provider 102, of performing pattern recognition. The operational flow diagram of FIG. 5 begins with step 502 and flows directly to step 504.

In step 504, the client 106 receives audio for transmission to the server 102. In an embodiment where the system of FIG. 1 represents a wireless network, such as described in FIG. 2, in step 504 the wireless device 106 receives audio 404 (see FIG. 4) via a microphone 404. Next, in step 506, the client 106, proceeds to perform feature extraction on the audio that was received. Feature extraction includes the quantization of pitch and class values for one frame. Feature extraction is described in greater detail below. In the wireless network embodiment, in step 506 the processor 320 (see FIG. 3) of wireless device 106 proceeds to perform feature extraction on the audio 402.

In step 508, the client 106 generates packet data including the extracted features for transmission to the server 102. Data packet generation is described in greater detail below. In the wireless network embodiment, in step 508 the wireless device 106 generates data packet 406 including the extracted features. Next, in step 510, the client 106, proceeds to transmit the data packet to the server 102. In the wireless network embodiment, in step 510 the transmitter 312 of wireless device 106 proceeds to transmit the data packet 406 to the wireless network provider or server 102 via wireless network 104.

In step 512, the server 102 receives the packet data sent by client 106 and, in step 514, the server 102 proceeds to reconstruct the audio based on the packet data. In step 516, the server 102 performs speech recognition based on the packet data received from the client 106. In the wireless network embodiment, in step 512, the wireless service provider or server 102 receives the data packet 406 sent by wireless device 106 and, in step 514, the wireless service provider or server 102 proceeds to reconstruct the audio based on the data packet 406. In step 516, the wireless service provider or server 102 performs speech recognition based on the data packet 406 received from the wireless device 106. In step 518, the operational flow of FIG. 5 stops.

III. Data Packet Creation

A. First Quantization Scheme

In the proposals for the extended DSR standards (in response to Work Items WI-030 and WI-034), the class (or voicing) information for a frame can take four possible values: 1) non-speech, i.e., silence or background noise, 2) unvoiced, 3) mixed voiced, and 4) fully voiced. These four values can be generally divided into two categories: not voiced (including the non-speech and unvoiced classes) and voiced (including the mixed voiced and fully voiced classes). To quantize class information for one frame, 2 bits are normally needed since there are four class values to represent and 2 bits can represent four values. The pitch information for a frame can take any value ranging from about 19 to about 140 samples. To quantize pitch information for one frame, e.g., as integer values, 7 bits are normally needed since there are 122 pitch values to represent and 7 bits can represent 128 values.

In one preferred embodiment of the present invention, by combining the class information and the pitch information, one bit per frame can be saved as follows. One of the 7-bit pitch codewords (the all-zero codeword, for example) is used to indicate that the class is not voiced (i.e., either non-speech or unvoiced). The remaining 127 non-zero 7-bit pitch codewords are used to represent different pitch values as well as the information that the class is voiced (i.e., either mixed-voiced or fully-voiced). That is, one of the 7-bit pitch codewords indicates that the class is not voiced while the remaining codewords indicate that the class is voiced. Consequently, one class bit is now sufficient to remove the ambiguity among the two not voiced classes (i.e., between non-speech and unvoiced classes) and among the two voiced classes (i.e., between mixed-voiced and fully-voiced classes).

The table below shows one example of 7-bit pitch codeword values and 1-bit codeword values used to indicate pitch and class information, as described above.

| Class Type | 7-bit Pitch Codeword | 1-bit Class Codeword |
| --- | --- | --- |
| Non-speech | all-zero | 0 |
| Unvoiced | all-zero | 1 |
| Mixed-voiced | non-zero | 0 |
| Fully-voiced | non-zero | 1 |

Thus, in summary, according to the present example, the total number of bits used to represent the class and pitch information is 8 bits. This is opposed to the 9 bits that would have been necessary to represent the class and pitch information, if the class and pitch information had been quantized separately (i.e., 7-bits for pitch and 2-bits for class; see above). The penalty incurred for such a scheme is that one out of the 128 pitch codewords has been used to indicate class information. Because of the relative unimportance of one codeword, this has very little (and insignificant) impact on the accuracy of pitch quantization.

Figure 6:
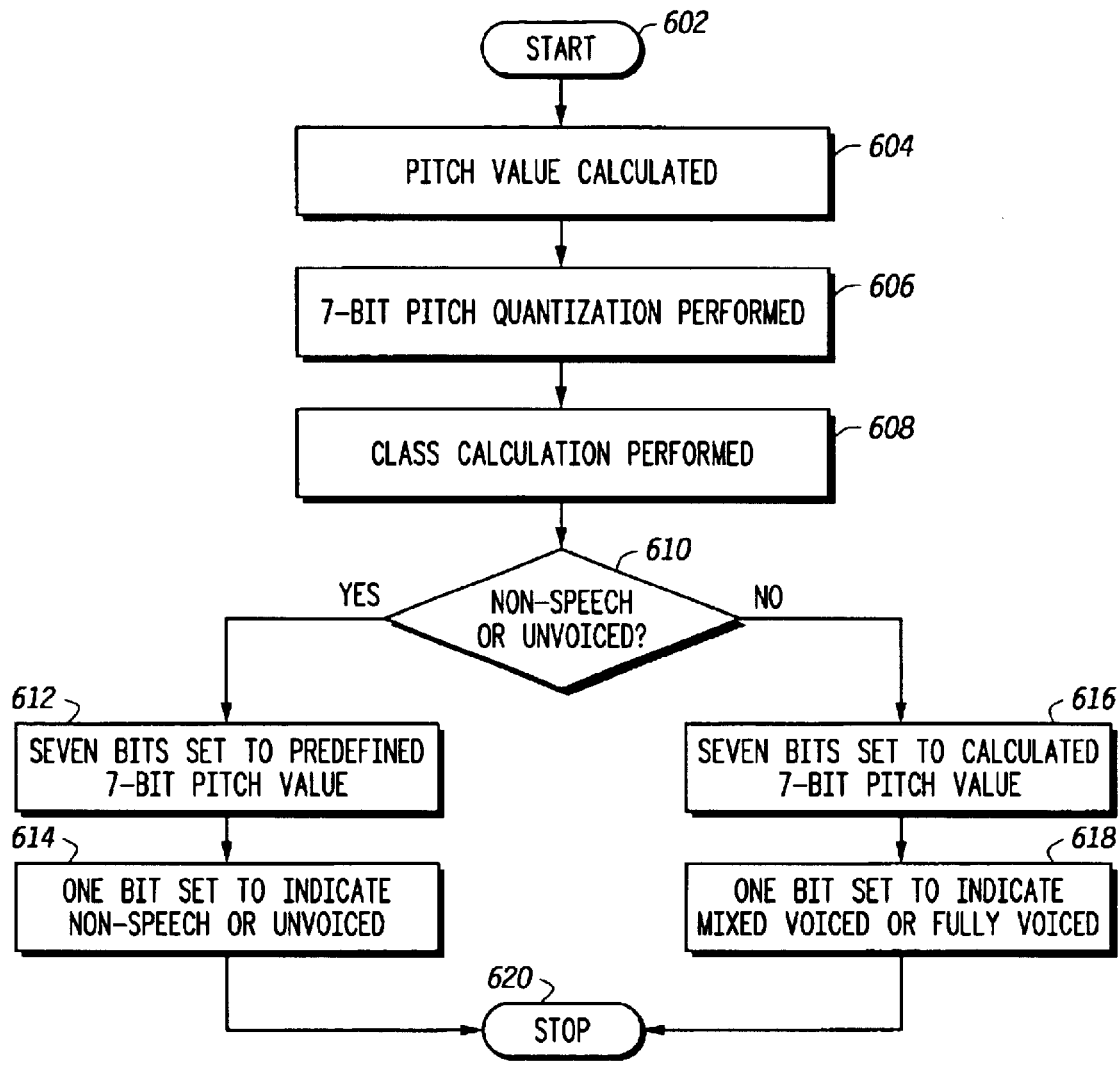
FIG. 6 is an operational flow diagram showing a class and pitch quantization process according to a preferred embodiment of the present invention.

FIG. 6 is an operational flow diagram showing a class and pitch quantization process according to a preferred embodiment of the present invention. The operational flow diagram of FIG. 6 depicts the process, on a client 106, of calculating pitch and class information and generating a data packet representing the same. FIG. 6 describes in more detail the steps 506 and 508 of FIG. 5. The operational flow diagram of FIG. 6 begins with step 602 and flows directly to step 604.

In step 604, the client 106 calculates the pitch value of the audio that was received. In the wireless network exemplary embodiment, in step 604, the wireless device 106 (more specifically, the processor 320 of wireless device 106) calculates the pitch value of the audio 402 that was received via microphone 404. In step 606, the client 106 performs pitch quantization based on the pitch value of the audio. In one example, 7-bit pitch quantization is performed, as described above. In the wireless network embodiment, in step 606, the wireless device 106 performs pitch quantization based on the pitch value of the audio 402.

In step 608, the client 106 performs class calculation of the audio. In step 610, the client 106 determines whether the class that was calculated in step 608 is of the not voiced category, i.e., either non-speech class or unvoiced class. If the result of the determination of step 610 is positive, then control flows to step 612. If the result of the determination of step 610 is negative, then control flows to step 616.

In step 612, the client 106 sets a pitch codeword to a predefined pitch codeword indicating a not voiced class category (i.e., non-speech class or unvoiced class) frame. In one example, the client 106 sets a 7-bit pitch codeword to all zeroes—the predefined pitch codeword indicating a non-speech class or unvoiced class frame. In step 614, the client 106 sets a class codeword to indicate the class of a not voiced class category (i.e., either non-speech class or unvoiced class) frame. In one example, the client 106 sets a 1-bit class codeword indicating either non-speech class or unvoiced class.

In step 616, the client 106 sets a pitch codeword to the pitch value generated for the pitch quantization performed in step 604. In one example, the client 106 sets a 7-bit pitch codeword to the pitch value generated for the pitch quantization performed in step 604. In step 618, the client 106 sets a class codeword to indicate the class of a voiced class category (i.e., either mixed voiced or fully voiced) frame. In one example, the client 106 sets a 1-bit class codeword indicating either mixed voiced class or fully voiced class. In step 620, the operational flow of FIG. 6 stops.

Figure 7:
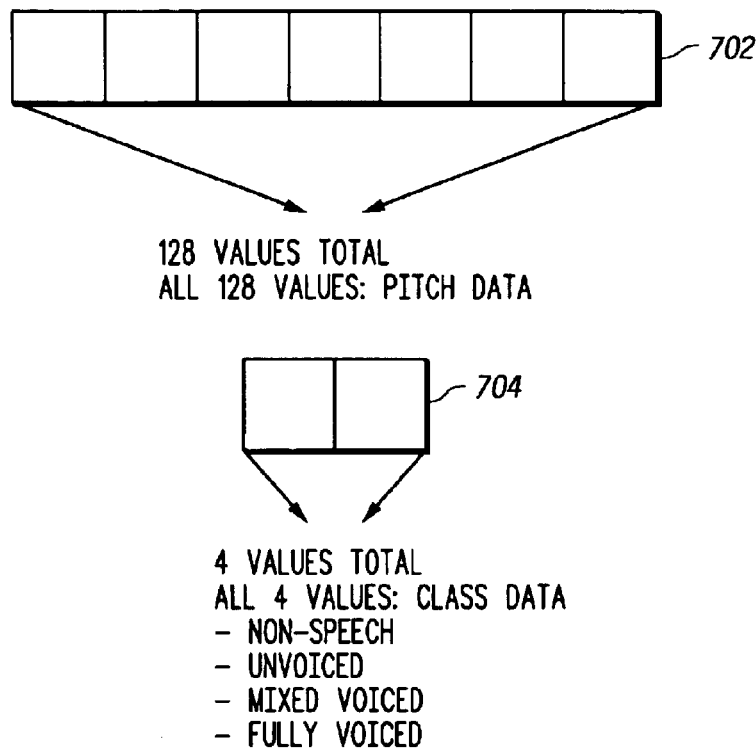
FIG. 7 is a block diagram illustrating the conventional bit allocations for the class and pitch quantization process.

FIG. 7 is a block diagram illustrating the conventional bit allocations for a class and pitch quantization process. FIG. 7 shows that seven bits represent pitch quantization 702. Thus, 128 possible values are used to represent a pitch period data of one frame of audio. FIG. 7 also shows that two bits represent class quantization 704. Thus, four possible values are used to represent the class of one frame of audio. Four classes are defined: non-speech, unvoiced, mixed voiced and fully voiced. Therefore, according to FIG. 7, a total of nine bits are used to represent pitch and class quantization values for one frame of audio.

Figure 8:
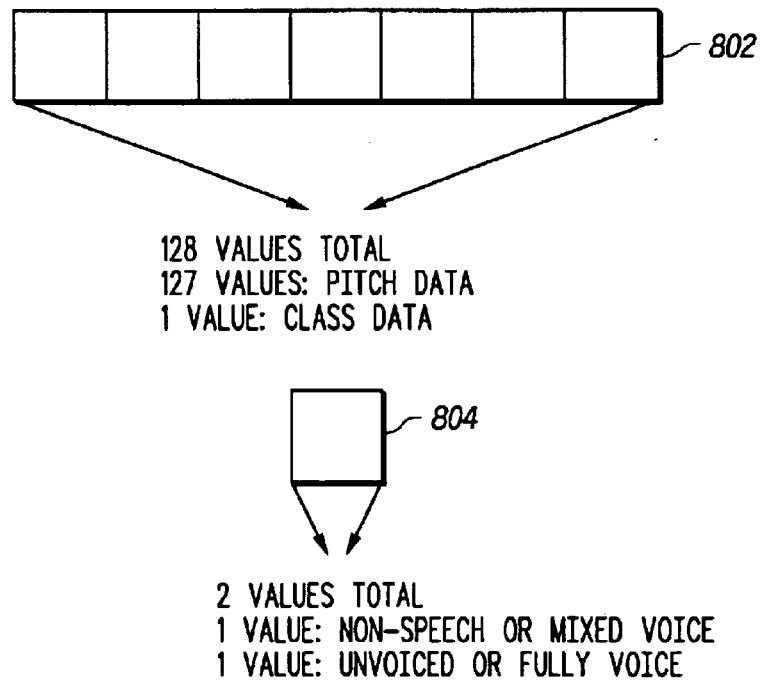
FIG. 8 is a block diagram illustrating the bit allocations for the class and pitch quantization process according to a preferred embodiment of the present invention.

FIG. 8 is a block diagram illustrating the bit allocations for the class and pitch quantization process according to a preferred embodiment of the present invention. FIG. 8 shows the bit allocations for class and pitch quantization according to the present invention. FIG. 8 shows that seven bits represent pitch quantization 802. However, of the 128 possible values available with the seven bits, only 127 values are used to represent pitch period data of one frame of audio. The remaining one value is used to indicate class information, specifically, the not voiced class category (i.e., non-speech class or unvoiced class). Preferably, the one value of 802 used to indicate class category is all zeroes and this value indicates a not voiced class category frame (i.e., non-speech class or unvoiced class). The other 127 values of 802 are used to indicate the pitch value of a voiced category frame (i.e., mixed voiced class or fully voiced class).

FIG. 8 also shows that one bit represents class quantization 804. This is a significant advantage of the present invention. Thus, two possible values, or codewords, are used to further represent the class of one frame of audio. The two possible values are used to differentiate among the not voiced class category (i.e., non-speech class or unvoiced class) and among the voiced category frame (i.e., mixed voiced class or fully voiced class). Preferably, a zero value of 804 is used to indicate a non-speech class if 802 is all zeroes, a zero value of 804 is used to indicate a mixed voice class if 802 is not all zeroes, a value of one of 804 is used to indicate an unvoiced class if 802 is all zeroes, and a value of one of 804 is used to indicate a fully voiced class if 802 is not all zeroes (see table above). Therefore, according to FIG. 8, a total of eight bits are used to represent pitch and class quantization values for one frame of audio.

B. Second Quantization Scheme

In the proposals for the extended DSR standards, the pitch period is estimated for each frame and is updated every 10 ms (or 100 times per second). The estimated pitch period can take fractional values and ranges from about 19 to about 140 samples at an 8 kHz sampling rate. Therefore, the estimated pitch frequency ranges from about 57 Hz to about 420 Hz. When performing the pitch quantization process, it is desirable to achieve accuracy, i.e., low quantization error, a low bit rate, and robustness against channel errors.

In a preferred embodiment of the present invention, all even-numbered frames (starting with the first frame numbered zero) are quantized using 7 bits and all odd-numbered frames are quantized using 5 bits. Considered as frame-pairs, the first frame in a frame-pair is quantized using 7 bits and the second frame in a frame-pair is quantized using 5 bits. Thus the average number of bits per frame is six. This corresponds to a bit rate of 600 bps due to pitch quantization alone.

An absolute quantization scheme is used for the even-numbered frames. Out of the 128 codewords available, one codeword (i.e., the all-zero codeword) is used for transmitting not voiced category class information, i.e., to indicate that the frame is non-speech or unvoiced. The remaining 127 codewords are used for quantization of the pitch period. This scheme is described in greater detail above. The pitch range from about 19 to about 140 samples is equally divided (in the logarithmic domain) into 127 regions and the midpoints of these regions are chosen as the reconstruction levels. For any given pitch value, the corresponding quantized pitch value is chosen as the nearest reconstruction level in the linear domain. The 127 codewords are assigned one-to-one to the 127 reconstruction levels. The maximum quantization error with this quantizer design is about 0.8%.

For the odd-numbered frames, a differential quantization scheme is used a majority of the time. However, under certain situations (as shown in the table below), an absolute quantization scheme is also used. For the differential quantization scheme, a reference has to be selected so that the difference between the current frame's pitch period value and the reference value (or more appropriately, the ratio of the two values) can be quantized. Although the quantized pitch period of the previous frame provides the best possible reference, this frame may not always be a voiced class category (i.e., either mixed voiced or fully voiced). Therefore, the quantized pitch period value of one of the preceding three frames is selected as the reference. That is, the differential quantization of the second frame of a frame-pair is performed using the quantized pitch period value of the first frame of the frame-pair or either of the two quantized pitch period values of the previous frame-pair as the reference.

At the server side, it is important to limit the propagation of errors due to an error in one of the decoded pitch period values. For this purpose, we identify each quantized pitch value at the client side as being either reliable (R) or unreliable (U) to serve as a reference. Each absolutely quantized pitch value is regarded as reliable. Each differentially quantized pitch value is considered reliable if the reference used for its quantization is the quantized pitch period value of the first frame of the same frame-pair. Since the pitch period values of neighboring frames are generally close to each other, pitch period values near the reference value are finely quantized and pitch period values farther away from the reference are coarsely quantized. The quantization levels chosen for differential quantization depend on which of the three preceding quantized pitch values has been chosen as the reference as well as the reference value. The table below illustrates how the pitch period values of odd-numbered frames are quantized.

| P(−2) | P(−1) | P(0) | Action Taken |
|---|---|---|---|
| 0 | 0 | 0 | Absolute Quantization |
| 0 | 1U | 0 | Absolute Quantization |
| * | * | 1 | Differential Quantization: Reference P(0) |
| * | 1R | 0 | Differential Quantization: Reference P(−1) |
| 1 | 0 | 0 | Differential Quantization Reference P(−2) |
| 1 | 1U | 0 | Differential Quantization Reference P(−2) |

In the above table, the value to be quantized is P(1), the pitch period value of the second frame of a frame pair. The reference value is the quantized pitch period value of one of the three preceding frames, i.e., P(0), the quantized pitch period value of the first frame of the same frame-pair, P(−1), the quantized pitch period value of the second frame of the previous frame-pair, and P(−2), the quantized pitch period value of the first frame of the previous frame-pair.

In the table, a value of "0" indicates that the corresponding frame is a not voiced category class (i.e., non-speech class or unvoiced class). A value of "1" indicates that the corresponding frame is a voiced class category (i.e., mixed-voiced class or fully-voiced class) and its quantized pitch period value can be used as a reference. For the differentially quantized P(−1), we also have "1R" and "1U" to indicate whether the quantized pitch period value is reliable or unreliable respectively. A "*" indicates that the quantized pitch period is inconsequential, i.e., the value can be a "0" or "1" and it does not make a difference. As initial conditions, we assume that P(−1)=0 and P(−2)=0 both at the encoder (i.e., client 106) and decoder (i.e., server 102). The last column indicates whether the pitch was quantized absolutely or differentially and if differentially, the reference frame used.

When the three preceding frames are of a not voiced category class or when the only reference value available is unreliable P(−1), P(1) is absolutely quantized using 5 bits. One codeword, such as the all-zero codeword, is used to indicate that the frame is of a not voiced category class. The remaining 31 codewords are used to quantize the pitch period P(1) in a manner similar to that used for quantizing the pitch period values of even-numbered frames. The absolute quantization option using 5 bits is chosen typically for the first frame of a voiced segment or for some misclassified frames belonging to a noisy background condition. In either case, the slightly larger quantization error resulting from the use of only 5 bits does not cause any significant loss of speech quality or intelligibility. The use of only 5 bits helps limit the propagation of decoding errors as we will explain later.

When the first frame of a frame-pair is of a voiced category class, then the corresponding quantized pitch period value is always chosen as the reference irrespective of the values of P(−1) and P(−2). According to an exemplary embodiment, out of 32 possible codewords (using 5 bits quantization of pitch period value), one codeword, such as the all-zero codeword, is used to indicate that the current frame is non-speech/unvoiced. Twenty seven codewords are used to cover a small pitch range around the reference value in a logarithmic fashion (similar to the 7-bit absolute quantization discussed above). Both of the end points of the pitch range represent reconstruction levels. The remaining four levels are used to coarsely quantize the rest of the pitch range as indicated in the table. Notice that the four levels chosen depend on the value of P(0). For example, if P(0) is small, then the four levels are greater than P(0). On the other hand, if P(0) is large, then all four levels are smaller than P(0).

When the first frame of a frame-pair is of the not voiced category class, then either P(−1) or P(−2),is chosen as the reference. If P(−1) corresponds to a frame of the voiced category class and is reliable, then it is chosen as the reference irrespective of the value of P(−2). If P(−1) corresponds to a not voiced category class frame or corresponds to a voiced category class frame but is unreliable, and P(−2) corresponds to a voiced category class frame, then P(−2) is chosen as the reference. Whether P(−1) or P(−2) is chosen as the reference, the quantization method is similar. One of the codewords, such as the all-zero codeword, is used to indicate that the current frame is of the not voiced category class. Twenty-five codewords are used to cover a small pitch range around the reference value in a logarithmic fashion (similar to the 7-bit absolute quantization discussed above). Both the pitch range end values represent reconstruction levels. The remaining six levels are used to coarsely quantize the rest of the pitch range.

The above quantization scheme satisfies the requirements for accuracy, low bit rate, and robustness as follows. By quantizing the pitch period values of the even-numbered frames with 7 bits and those of the odd-numbered frames with 5 bits, an average of 1 bit per frame is saved, i.e., 100 bits per second. At the same time, accuracy is not compromised. Seven-bit absolute quantization is sufficiently accurate. Five-bit absolute quantization is used typically for the first frame of a voiced segment and for some noisy background frames. In either case, the lack of accuracy is not critical and does not affect the quality or intelligibility of the reconstructed speech in any significant way. With 5-bit differential quantization, the pitch period values, which are close to the reference value, are quantized rather accurately. These are the high probability pitch period values. The pitch period values, which are farther away from the reference value are of low probability and are quantized coarsely. Once again, the larger error in the quantization of these values is not critical and does not significantly affect the quality or intelligibility of the reconstructed speech.

Error propagation in the present invention is limited by identifying differentially quantized pitch period values as reliable and unreliable and by using 5-bit absolute quantization for odd-numbered frames whenever there is no reference value available or the only reference value available is unreliable. For example, consider the situation where a number of frame-pairs have been erased. This is the most common type of channel error situation for a DSR channel. Assume that the bits corresponding to the frames following the erasures have been received correctly. If the first frame of the frame-pair following the erasures is a voiced frame, then there is no propagation of error at all. This is because the first frame is always absolutely quantized (using 7 bits) and the second frame is differentially quantized using the quantized pitch period value of the first frame as the reference. Also, the following frames do not depend on any of the erased frames.

If the first frame is of a not voiced category class, then the second frame cannot be decoded correctly unless it is also a not voiced category class. This is because the second frame's pitch value could have been differentially quantized using the quantized pitch value of one of the last erased frame as reference. In this case, the error has propagated to the second frame following the erasures.

If the third frame is of a voiced category class, then the error propagation ceases because the quantized pitch period values of all the frames following the third frame do not depend on the erased frames or the correctly received frame-pair following the erasures. If the third frame is of a not voiced category class, then the quantized pitch period value of the fourth frame can be successfully decoded because it must have been absolutely quantized given that the first and third frames are of a not voiced category class and the second frame is unreliable. Therefore, the error propagation following the erasure of one or more frame-pairs ceases after two frames at the most.

Similarly, it can be shown that any error in the decoded pitch period value of an even-numbered frame (due to random bit errors) can propagate up to three frames at most. In addition, any error in the decoded pitch period value of an odd-numbered frame (due to random bit errors) can propagate up to two frames at most.

Figure 9A:
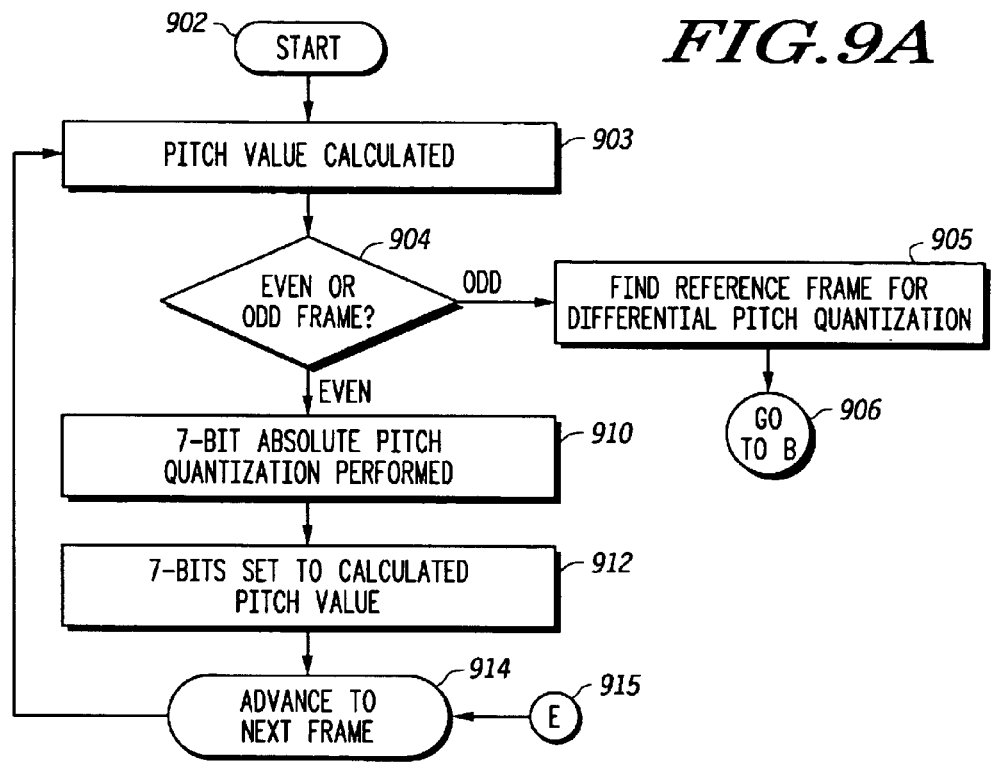
FIGS. 9A, 9B and 9C are an operational flow diagram showing another pitch quantization process according to a preferred embodiment of the present invention.
Figure 9B:
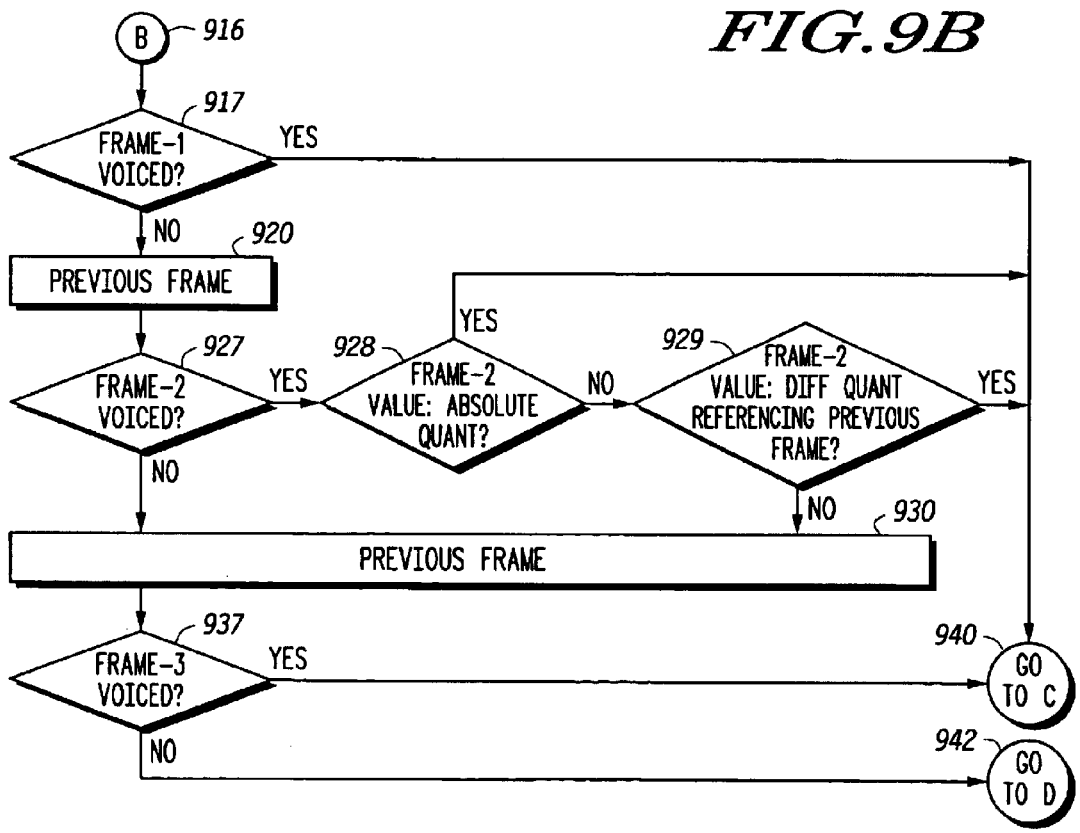
Figure 9C:
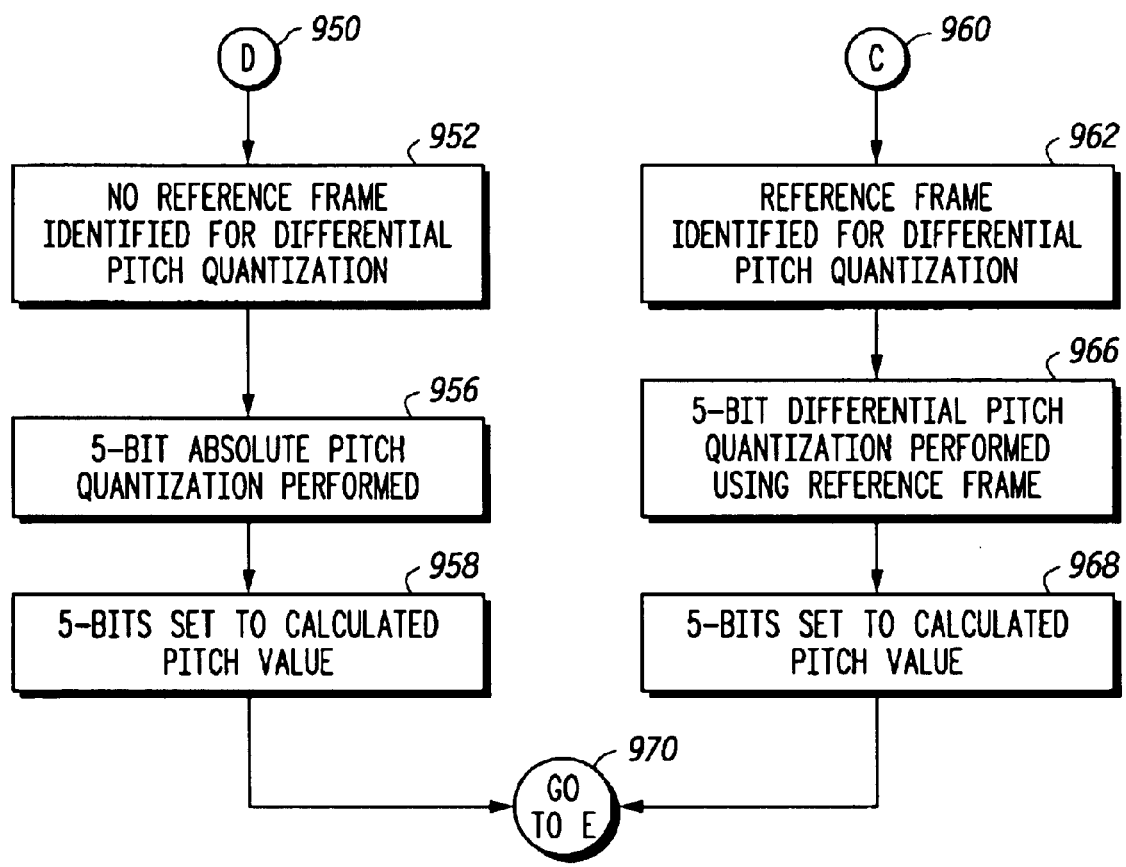

FIGS. 9A, 9B and 9C are an operational flow diagram showing another pitch quantization process according to a preferred embodiment of the present invention. The operational flow diagram of FIGS. 9A, 9B and 9C depicts the process, on a client 106, of calculating pitch information for one frame, generating a data packet representing the same and continuing with the next frame. FIGS. 9A, 9B and 9C describe in more detail the steps 506 and 508 of FIG. 5. The operational flow diagram of FIGS. 9A, 9B and 9C begins with step 902 (in FIG. 9A) and flows directly to step 904.

In step 903, the client 106 calculates the pitch value of the audio for the current frame. In the wireless network embodiment, in step 903, the wireless device 106 (more specifically, the processor 320 of wireless device 106) calculates the pitch value of the audio 402 that was received via microphone 404. In step 904, the client 106 determines whether the current frame is an even or odd frame. If the result of the determination of step 904 is even, then control flows to step 910. If the result of the determination of step 904 is odd, then control flows to step 905. In step 905, the current frame is an odd frame and thus, the client 106 proceeds to find an adequate reference frame to utilize for differential pitch quantization. In step 906, control flows directly to step 916 (B) of FIG. 9B.

In step 910, the client 106 performs absolute pitch quantization based on the pitch value of the audio. In one example, 7-bit absolute pitch quantization is performed, as described above. In the wireless network embodiment, in step 910, the wireless device 106 performs absolute pitch quantization based on the pitch value of the audio 402.

In step 912, the client 106 sets a pitch codeword to the pitch value generated for the absolute pitch quantization performed in step 910. In one example, the client 106 sets a 7-bit pitch codeword to the pitch value generated for the absolute pitch quantization performed in step 910. In step 915 (E), control flows directly to step 914. In step 914, the pitch quantization process advances to the next frame and the control flows directly back to step 903.

In step 916 (B) of FIG. 9B, control flows directly to step 917. In step 917, the client 106 determines whether the class of the frame immediately preceding the current frame "0" is of the voiced category class (i.e., mixed voiced class or fully voiced class). Note that in FIGS. 9B and 9C, the current frame is designated frame "0", the frame immediately preceding frame "0" is frame "−1", the frame immediately preceding frame "−1" is frame "−2" and the frame immediately preceding frame "−2" is frame "−3." If the result of the determination of step 917 is positive, then control flows to step 940. If the result of the determination of step 917 is negative, then control flows to step 920. In step 920, the client 106 proceeds to the previous frame to continue to seek an adequate reference frame to utilize for differential pitch quantization.

In step 927, the client 106 determines whether the class of frame "−2" is of the voiced category class (i.e., mixed voiced class or fully voiced class). If the result of the determination of step 927 is positive, then control flows to step 928. If the result of the determination of step 927 is negative, then control flows to step 930. In step 928, the client 106 determines whether the pitch value of frame "−2" was absolutely quantized. If the result of the determination of step 928 is positive, then control flows to step 940. If the result of the determination of step 928 is negative, then control flows to step 929. In step 929, the client 106 determines whether the pitch value of frame "−2" was differentially quantized and is reliable (that is, it was differentially quantized and referenced the frame immediately preceding it). If the result of the determination of step 929 is positive, then control flows to step 940. If the result of the determination of step 929 is negative, then control flows to step 930.

In step 930, the client 106 proceeds to the previous frame to continue to seek an adequate reference frame to utilize for differential pitch quantization. In step 937, the client 106 determines whether the class of frame "−3" is of the voiced category class (i.e., mixed voiced class or fully voiced class). If the result of the determination of step 937 is positive, then control flows to step 940. If the result of the determination of step 937 is negative, then control flows to step 942. Step 940 flows directly to step 960 (C) of FIG. 9C and step 942 flows directly to step 950 (D) of FIG. 9C.

In step 950 (D) of FIG. 9C, control flows directly to step 952. In step 952, it is determined that no adequate reference frame has been found for differentially quantizing the current frame "0." In step 956, the client 106 performs absolute pitch quantization based on the pitch value of the audio. In one example, 5-bit absolute pitch quantization is performed, as described above. In the wireless network embodiment, in step 956, the wireless device 106 performs absolute pitch quantization based on the pitch value of the audio 402. In step 958, the client 106 sets a pitch codeword to the pitch value generated for the absolute pitch quantization performed in step 956. In one example, the client 106 sets a 5-bit pitch codeword to the pitch value generated for the absolute pitch quantization performed in step 956.

In step 960 (C) of FIG. 9C, control flows directly to step 962. In step 962, it is determined that an adequate reference frame has been found for differentially quantizing the current frame "0." In step 966, the client 106 performs differential pitch quantization referencing the identified reference frame. In one example, 5-bit differential pitch quantization is performed, as described above. In step 968, the client 106 sets a pitch codeword to the pitch value generated for the differential pitch quantization performed in step 966. In one example, the client 106 sets a 5-bit pitch codeword to the pitch value generated for the differential pitch quantization performed in step 966.

In step 970, the control flows directly back to step 915 (E) of FIG. 9A. In step 915 (E), control flows directly to step 914. In step 914, the pitch quantization process advances to the next frame and the control flows directly back to step 903.

C. Review of Prior Art

In the Mixed Excitation Linear Prediction (MELP) standard (a telecommunications standard), there is no distinction between non-speech and unvoiced speech frames. Both classes are combined together and indicated by a zero pitch period value. An additional 4 bits are used for quantizing class information when the pitch period is greater than zero, i.e., when a frame is of the voiced category class (e.g., mixed voiced or fully voiced). These 4 bits identify voicing in different bands of speech spectrum. The pitch value is quantized absolutely using 7 bits. Therefore, there is no bit saving in MELP, such as described in the present invention.

In LPC-10 (another telecommunications standard), 7 bits are used to indicate a voiced category class frame and pitch. There are 60 pitch period levels and 3 levels used to indicate that: 1) both half-frames are of the not voiced category class (i.e., non-speech class and unvoiced class), 2) only the second half-frame is of the voiced category class (i.e., mixed voiced class and fully voiced class) or 3) only the first half-frame is of the voiced category class. Therefore, LPC-10 only distinguishes between the voiced category class and the unvoiced category class. LPC-10 does not distinguish among the voiced category class (i.e., between non-speech and unvoiced classes) or among the unvoiced category class (i.e., between the mixed voiced and fully voiced classes). The present invention extends LPC-10 with the introduction of non-speech and unvoiced classes under the not voiced category class and mixed voiced and fully voiced classes under the voiced category classes.

IV. Exemplary Implementations

The present invention can be realized in hardware, software, or a combination of hardware and software in clients 106, 108 or server 102 of FIG. 1. A system according to a preferred embodiment of the present invention, as described in FIGS. 5, 6, 9A, 9B and 9C, can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product (in clients 106 and 108 and server 102), which comprises all the features enabling the implementation of the methods described herein, and which, when loaded in a computer system, is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer-readable medium, allowing a computer system, to read data, instructions, messages or message packets, and other computer-readable information from the computer-readable medium. The computer-readable medium may include non-volatile memory, such as ROM, Flash memory, Disk drive memory, CD-ROM, and other permanent storage. Additionally, a computer-readable medium may include, for example, volatile storage such as RAM, buffers, cache memory, and network circuits. Furthermore, the computer-readable medium may comprise computer-readable information in a transitory state medium such as a network link and/or a network interface, including a wired network or a wireless network, that allow a computer system to read such computer-readable information.

Figure 10:
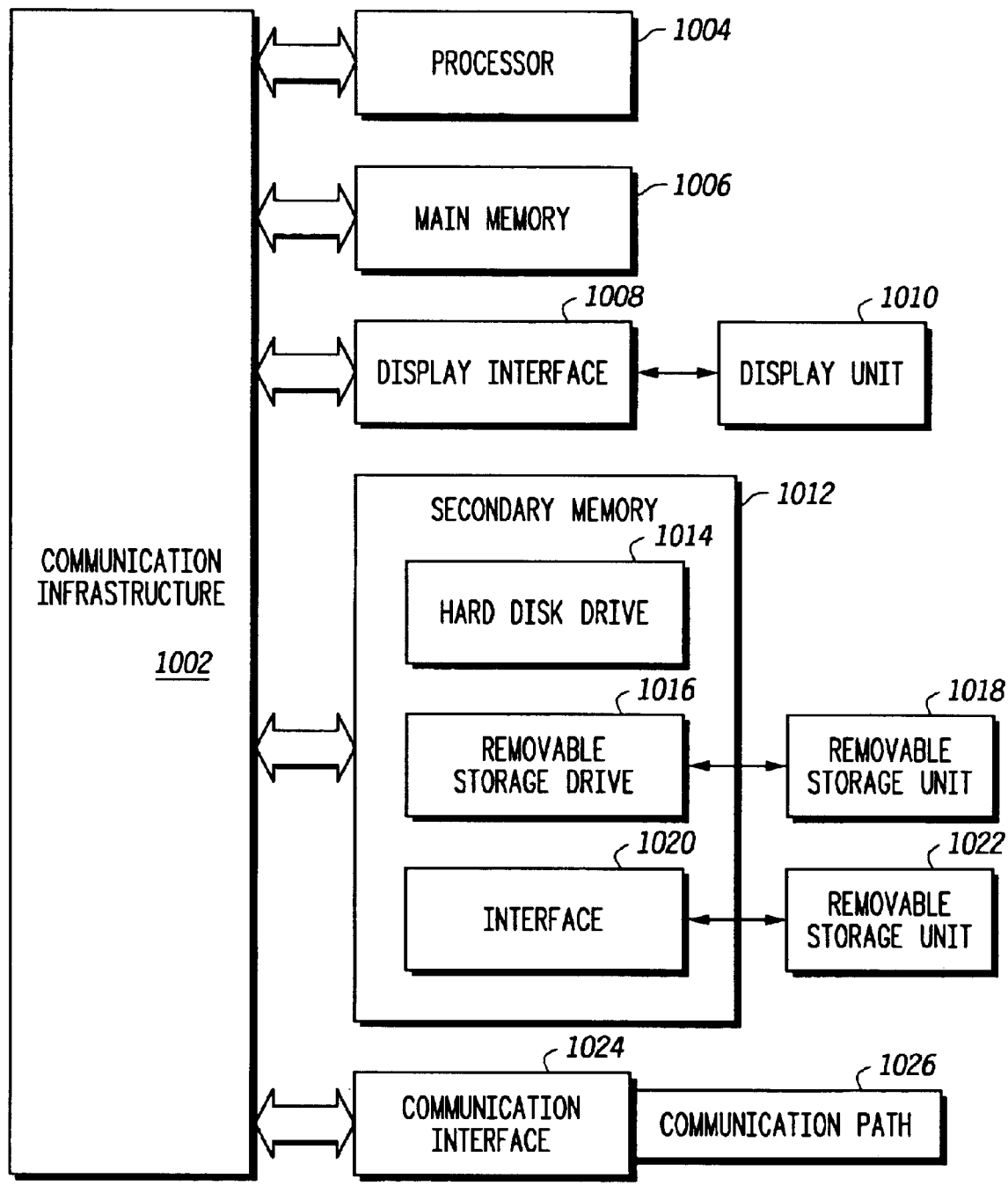
FIG. 10 is a block diagram of an information processing system useful for implementing a preferred embodiment of the present invention.

FIG. 10 is a block diagram of a computer system useful for implementing an embodiment of the present invention. The computer system of FIG. 10 is a more detailed representation of clients 106 and 108 and server 102. The computer system of FIG. 10 includes one or more processors, such as processor 1004. The processor 1004 is connected to a communication infrastructure 1002 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1008 that forwards graphics, text, and other data from the communication infrastructure 1002 (or from a frame buffer not shown) for display on the display unit 1010. The computer system also includes a main memory 1006, preferably random access memory (RAM), and may also include a secondary memory 1012. The secondary memory 1012 may include, for example, a hard disk drive 1014 and/or a removable storage drive 1016, representing a floppy disk drive, a magnetic tape drive, an optical disk drive, etc. The removable storage drive 1016 reads from and/or writes to a removable storage unit 1018 in a manner well known to those having ordinary skill in the art. Removable storage unit 1018, represents a floppy disk, magnetic tape, optical disk, etc., which is read by and written to by removable storage drive 1016. As will be appreciated, the removable storage unit 1018 includes a computer usable storage medium having stored therein computer software and/or data.

In alternative embodiments, the secondary memory 1012 may include other similar means for allowing computer programs or other instructions to be loaded into the computer system. Such means may include, for example, a removable storage unit 1022 and an interface 1020. Examples of such may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to the computer system.

The computer system may also include a communications interface 1024. Communications interface 1024 allows software and data to be transferred between the computer system and external devices. Examples of communications interface 1024 may include a modem, a network interface (such as an Ethernet card), a communications port, a PCM-CIA slot and card, etc. Software and data transferred via communications interface 1024 are in the form of signals which may be, for example, electronic, electromagnetic, optical, or other signals capable of being received by communications interface 1024. These signals are provided to communications interface 1024 via a communications path (i.e., channel) 1026. This channel 1026 carries signals and may be implemented using wire or cable, fiber optics, a phone line, a cellular phone link, an RF link, and/or other communications channels.

In this document, the terms "computer program medium," "computer-usable medium," "machine-readable medium" and "computer-readable medium" are used to generally refer to media such as main memory 1006 and secondary memory 1012, removable storage drive 1016, a hard disk installed in hard disk drive 1014, and signals. These computer program products are means for providing software to the computer system. The computer-readable medium allows the computer system to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer-readable medium may comprise computer-readable information in a transitory state medium such as a network link and/or a network interface, including a wired network or a wireless network, that allow a computer to read such computer-readable information.

Computer programs (also called computer control logic) are stored in main memory 1006 and/or secondary memory 1012. Computer programs may also be received via communications interface 1024. Such computer programs, when executed, enable the computer system to perform the features of the present invention as discussed herein. In particular, the computer programs, when executed, enable the processor 1004 to perform the features of the computer system. Accordingly, such computer programs represent controllers of the computer system.

V. Conclusion

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method on an information processing system for quantizing class information and pitch information of audio, comprising:

receiving audio;

capturing a frame of the audio;

determining a pitch of the frame;

calculating a codeword representing the pitch of the frame, wherein a first codeword value indicates an indefinite pitch;

determining a class of the frame, wherein the class is any one of at least two classes indicating an indefinite pitch and at least one class indicating a definite pitch; and calculating a codeword representing the class of the frame, wherein the codeword length is the maximum of the minimum number of bits required to represent the at least two classes indicating an indefinite pitch and the minimum number of bits required to represent the at least one class indicating a definite pitch, wherein the pitch and the class of the frame are represented by the two codewords.

2. The method of claim 1, wherein if the codeword representing the pitch of the frame indicates an indefinite pitch, then the codeword representing the class of the frame indicates one of the at least two classes indicating an indefinite pitch.

3. The method of claim 2, wherein if the codeword representing the pitch of the frame indicates a definite pitch, then the codeword representing the class of the frame indicates one of the at least one class indicating a definite pitch.

4. The method of claim 3, wherein the at least two classes indicating an indefinite pitch includes a non-speech class and an unvoiced class.

5. The method of claim 1, wherein the information processing system is any one of a client computer and a wireless device such as a mobile telephone.

6. The method of claim 5, wherein the audio pertains to speech.

7. The method of claim 6, wherein a frame duration is from 20 to 30 milliseconds and consequent frames overlap each other by from 10 to 15 milliseconds.

8. The method of claim 1, further comprising:

transmitting the codeword representing the pitch of the frame and the codeword representing the class of the frame to a server.

9. An information processing system for quantizing class information and pitch information of audio, comprising:

a microphone for receiving audio; and a digital signal processor for capturing a frame of the audio, determining a pitch of the frame, calculating a codeword representing the pitch of the frame, wherein a first codeword value indicates an indefinite pitch, determining a class of the frame, wherein the class is any one of at least two classes indicating an indefinite pitch and at least one class indicating a definite pitch and calculating a codeword representing the class of the frame, wherein the codeword length is the maximum of the minimum number of bits required to represent the at least two classes indicating an indefinite pitch and the minimum number of bits required to represent the at least one class indicating a definite pitch, wherein the pitch and the class of the frame are represented by the two codewords.

10. The information processing system of claim 9, wherein if the codeword representing the pitch of the frame indicates an indefinite pitch, then the codeword representing the class of the frame indicates one of the at least two classes indicating an indefinite pitch.

11. The information processing system of claim 10, wherein if the codeword representing the pitch of the frame indicates a definite pitch, then the codeword representing the class of the frame indicates one of the at least one class indicating a definite pitch.

12. The information processing system of claim 11, wherein the at least two classes indicating an indefinite pitch includes a non-speech class and an unvoiced class.

13. The information processing system of claim 9, wherein the information processing system is any one of a client computer and a wireless device such as a mobile telephone.

14. The information processing system of claim 13, wherein the audio pertains to speech.

15. The information processing system of claim 14, wherein a frame duration is from 20 to 30 milliseconds, and subsequent frames overlap each other by from 10 to 15 milliseconds.

16. The information processing system of claim 9, further comprising:

a transmitter for transmitting the codeword representing the pitch of the frame and the codeword representing the class of the frame to a server.

17. A method in a distributed speech recognition system, the method comprising:

receiving audio;

organizing the received audio into frames;

quantizing audio pitch information for each frame, wherein the quantized audio pitch information for each frame being represented by one of a plurality of quantized pitch values; and quantizing class information for each frame, wherein the quantized class information for each frame being represented by one of a plurality of quantized class values, and wherein one of the plurality of quantized pitch values being reserved to indicate whether the quantized class information for each frame is one of a not voiced class category and a voiced class category, the quantized class value for each frame being selected from one of a plurality of quantized class values for the not voiced class category and at least one quantized class value for the voiced class category.

18. The method of claim 17, further comprising:

providing at least one codeword including quantized pitch information and quantized class information for at least one frame.

19. The method of claim 17, wherein the quantized class value for each frame being represented by a minimum number of bits required to represent one of at least two classes.

* * * * *